No. 623,482. Patented Apr. 18, 1899.
G. H. LEWIS.
PACKING FOR PISTON RODS.
(Application filed Nov. 15, 1897.)
(No Model.)

Attest
Wallew Donaldson
C. S. Middleton

Inventor
George Harris Lewis
by Richards & Co
Attys

THE NORRIS PETERS CO., PHOTO-LITHO., WASHINGTON, D. C.

UNITED STATES PATENT OFFICE.

GEORGE HARRIS LEWIS, OF GALVESTON, TEXAS.

PACKING FOR PISTON-RODS.

SPECIFICATION forming part of Letters Patent No. 623,482, dated April 18, 1899.

Application filed November 15, 1897. Serial No. 658,602. (No model.)

*To all whom it may concern:*

Be it known that I, GEORGE HARRIS LEWIS, a citizen of the United States, residing at Galveston, Texas, have made certain new and useful Improvements in Packing for Piston-Rods and the Like, of which the following is a specification.

My invention relates to packing for piston-rods and the like; and its object is to provide a series of metallic rings adapted to surround the piston-rod, with a flexible backing surrounding the rings and adapted to keep them pressed against the piston-rod, thus not only allowing for contraction and expansion, but also allowing for wear, the metallic rings being kept pressed against the piston-rod by a rubber backing until they are nearly, if not quite, worn out. The metallic rings protect the rubber backing from undue wear, and by the general construction and arrangement I provide a perfect steam-tight joint and insure perfect lubrication at all parts of the piston-rod.

Figure 1:
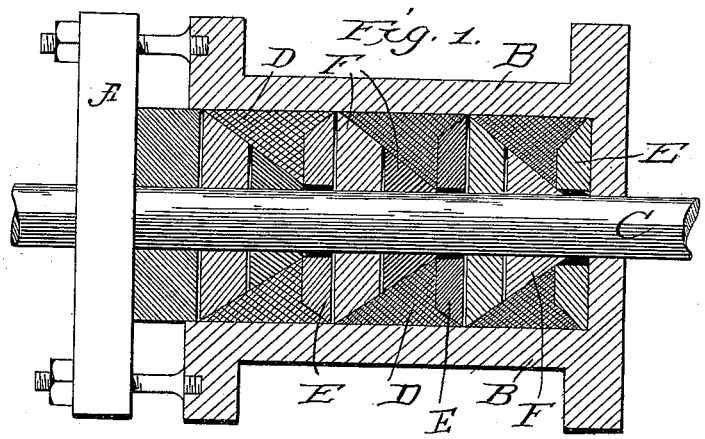
Figure 2:
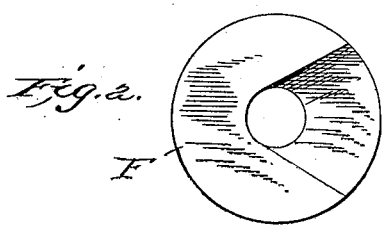
Figure 5:
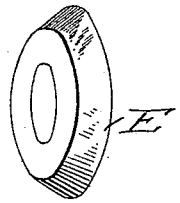
Figure 3:
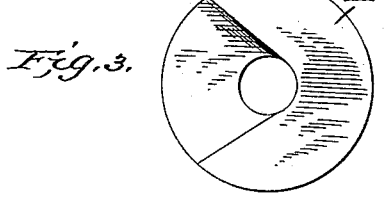
Figure 6:
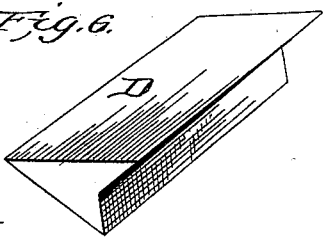
Figure 4:
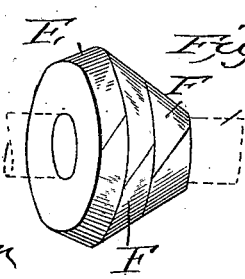

In the drawings, Figure 1 shows the stuffing-box fitted with my invention; and Figs. 2, 3, 4, 5, and 6 show details of the various parts comprising the invention.

In the figures the stuffing-box is shown at B, the piston-rod at C, and the gland at A, these parts being of any well-known or approved construction.

Encircling the piston-rod are a series of rings, preferably of aluminium, these rings being arranged as shown and comprising tapering or cone-shaped rings F and a third ring E, having an opening of greater diameter than the openings through the rings F, and by reason of the point of the adjacent ring F entering the opening of the ring E these rings are kept out of contact with the piston-rod, and thus form recesses in which the lubricant accumulates, and this serves to perfectly oil the piston-rod.

The outer peripheries of the ring E are inclined in a direction opposite to that of the rings F, and in order to keep the rings together and to constantly exert a pressure on them against the piston-rod I provide an elastic backing D, composed of rubber, this backing being of the shape shown, so as to conform to the angular space between the rings and the inner wall of the stuffing-box, and it will be seen that this provides a constant pressure on the rings to hold them in contact with each other and the rings F in contact with the piston-rod. I prefer to make the rings split, so as to permit of expansion and contraction.

I claim—

In combination in a packing, a ring of conical form, a ring of frusto-conical form having its base in contact with that of the conical ring, and angular packing having a notched base to fit the conical and frusto-conical rings, substantially as described.

In witness whereof I have hereunto set my hand in presence of two witnesses.

GEORGE HARRIS LEWIS.

Witnesses:
JOSEPH A. LABATT,
HENRY J. LABATT.